United States Patent

[11] 3,624,267

| [72] | Inventor | Walter A. Plummer<br>3546 Crownridge Drive, Sherman Oaks, Calif. |
|---|---|---|
| [21] | Appl. No. | 76,072 |
| [22] | Filed | Sept. 28, 1970 |
| [45] | Patented | Nov. 30, 1971 |

[54] WRAPAROUND ELECTRICAL SHIELDING JACKET AND METHOD FOR WIRE HARNESS
9 Claims, 5 Drawing Figs.

[52] U.S. Cl. ..................................................... 174/36, 156/53, 174/68 C
[51] Int. Cl. ....................................................... H01b 11/06
[50] Field of Search ............................................ 174/36, DIG. 11, 102 R, 107, 117, 117 FF, 68 C; 156/54, 53, 52, 51

[56] References Cited
UNITED STATES PATENTS

| 3,467,761 | 9/1969 | Plummer | 174/36 |
| 3,413,406 | 11/1968 | Plummer | 174/36 |
| 3,357,455 | 12/1967 | Plummer | 174/DIG. 11 |
| 3,089,915 | 5/1963 | Plummer | 174/36 |

*Primary Examiner*—Lewis H. Myers
*Assistant Examiner*—A. T. Grimley
*Attorney*—Sellers and Brace ABSTRACT: Wraparound shielded jacketing for enshrouding wire harness to provide a continuous tubular conductive barrier against the passage of electrical flux fields and held snugly assembled about the harness by closely spaced servings of cording. The jacketing comprises an inner conductive layer laminated to an outer nonconductive layer and having its opposite edges respectively processed to render one conductive on both surfaces and the other nonconductive, the former being assembled to the harness to underlie the overlapped edges of the jacketing thereby to electrically interconnect the edge of the conductive layer and provide a continuous conductive tube surrounding the wire harness.

PATENTED NOV 30 1971

3,624,267

INVENTOR
WALTER A. PLUMMER
BY
ATTORNEYS

WRAPAROUND ELECTRICAL SHIELDING JACKET AND METHOD FOR WIRE HARNESS

This invention relates to electrical shielding jackets and more particularly to an improved shield product and a method of protecting wire harness, cabling and the like against the passage of electrical flux fields.

It is of critical importance in the use of many types of electrical equipment that the wire harness employed to interconnect various components be protected against the adverse effects of electrical flux fields of other equipment. Various shielding jackets have been proposed for this purpose and are in common use. In many instances such prior constructions are eminently satisfactory and comprise a laminated main body having at least one conductive layer and one nonconductive layer secured together and provided with suitable seam means extending lengthwise thereof and effective to hold the jacket assembled about the cabling or wire harness.

In certain environments however, this prior jacketing is unsatisfactory and unsuitable for use because of extreme difficulties encountered in either the initial assembly operation or in maintaining the jacketing properly assembled under operating conditions. These difficulties are particularly apparent when attempting to shield wire harness already installed in a congested environment. It not infrequently happens that the installed wire harness includes sharp bends but it also may vary widely in girth along different portions thereof and may be subject to other adverse conditions. The interlocking seam components customarily employed to hold shielded jacketing assembled about the harness can be extremely difficult to assemble and close under these conditions. Moreover if the strain in certain areas is excessive the seam can open thereby causing gaps in the shielding and rendering the shield partially or wholly ineffective for its intended purpose. Additionally, if the jacket does not fit the harness snugly it not infrequently happens that the seam remains closed but ineffective to hold the opposite lateral edges of the conductive layer in continuous contact with one another with the result that the shield is only partially effective for reasons well known by those skilled in this art. Also, if the jacket is loose, under strain, or subject to strong slipstream or other high velocity air currents, as it often is in aircraft and the like operating environments, the jacketing seam can open and cause malfunctioning of the shielding jacket.

The foregoing and other numerous shortcomings of prior shielding jacketing constructions are avoided by the present invention which includes an elongated strip of laminated shielding material having at least one conductive layer and one nonconductive layer. This strip is bound along one edge with nonconductive material and along the other edge with conductive material and a flexible-braid-type conductor. This simple, inexpensive jacket is snugly wrapped about the harness to be shielded with its lateral edges overlapped to conceal the electrically conductive edge and is held in place about the harness by servings of cording. The cord servings can be located as close together as necessary to hold the jacketing snugly compressed against the harness with the conductive binder edge underlying and pressed in contact with the jacket conductive layer to assure continuous highly effective shielding about all portions of the cable or harness. The absence of a seam greatly facilitates the assembly and avoids difficulties associated with the use of a tool or slider to close the seam. In some cases, it may be desirable to apply the jacketing spirally along at least portions of the harness for reasons which will be explained more fully presently and is accomplished without in any way interfering with the provision of the continuous metal-to-metal contact between the overlapped edges of the jacket.

Accordingly, it is a primary object of the present invention to provide a simplified and improved shielding jacket for wire harness, cabling and the like of unusual versatility and reliability.

Another object of the invention is the provision of a thin flexible supple shielding jacket for enshrouding wire harness and including a conductive layer designed to provide a complete continuous tubular conductive shroud for wire harness and designed to be held snugly assembled thereabout by closely spaced servings of cording.

Another object of the invention is the provision of an improved highly reliable method of enshrouding installed cabling and wire harness with a barrier against the passage of electrical flux fields and capable of resisting displacement or opening of the overlapped edges of the conductive layer under severe and adverse operating conditions.

These and other more specific objects will appear upon reading the following specification and claims and upon considering in connection therewith the attached drawing to which they relate.

Referring now to the drawing in which a preferred embodiment of the invention is illustrated;

Figure 2:
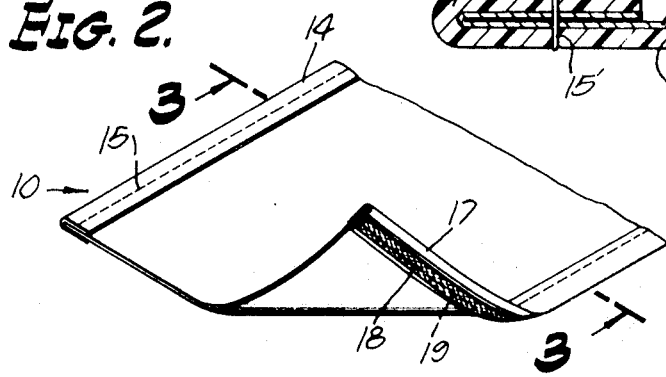
FIG. 2 is a perspective view of the jacket per se before assembly to cabling.
Figure 3:
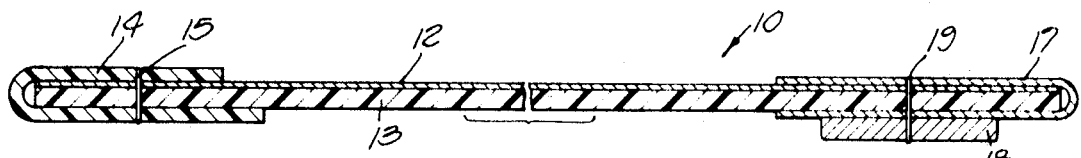
FIG. 3 is a cross-sectional view on an enlarged scale taken along line 3—3 on FIG. 2.
Figure 4:
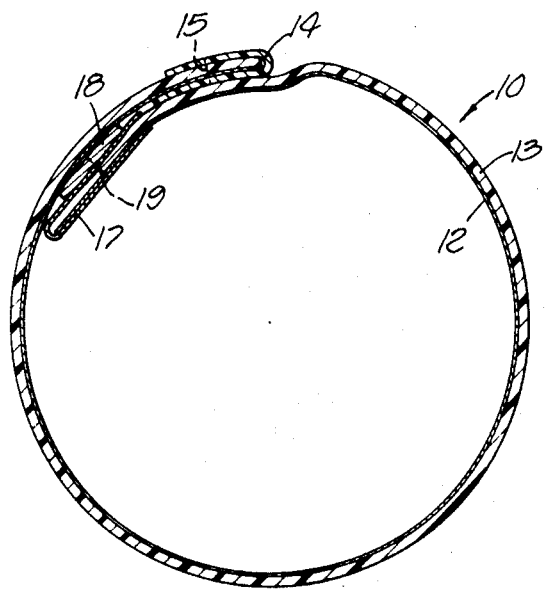
FIG. 4 is a cross-sectional view through the jacketing assembled with its edges properly overlapped but without the cording.

Referring initially more particularly to FIGS. 2 and 3, there is shown a preferred embodiment of the invention jacketing, designated generally 10, comprising a continuous strip of laminated material having adequate width to embrace a wire harness 11 to be protected and with its opposite edges widely overlapped in the manner clearly indicated in FIG. 4. Jacketing 10 comprises a main body having an inner layer of foillike conductive material 12 bonded to an outer relatively thick nonconductive layer 13 of suitable elastomeric material, such as polyethylene, polyvinylchloride, rubber, or the like. The continuous layers of laminated material 12,13 are coextensive in width and superimposed directly against one another.

One lateral edge of the jacket is embraced by a binder strip 14 of nonconductive material, such as sheet plastic, and secured in place by stitching 15 along with a continuous length of flexible wire braiding 18. Braid 18 is preferably secured outermost and on the remote side of the laminate from conductive layer 12.

In use, jacketing 10 is placed lengthwise of the wire harness or cabling 11 to be shielded and snugly wrapped thereabout with the conductive binder 17 underlying the opposite lateral edge of the jacket. In general, the overlapped edges will lie along one side of the harness and lengthwise thereof. However, in other instances and particularly where the jacketing is not sufficiently wide to encircle the harness with adequate overlap, it may be wrapped spirally at a pitch adequate to provide ample overlapping of its edges. In all cases, the jacketing should be applied in such manner that the conductive binder 17 or braid 18 or both, is in firm contact with a juxtaposed surface area of conductive layer 12 in the manner made evident by FIG. 4. It is undesirable for the two binder strips 14,17 to be in contact with one another as this electrically isolates the conductive layer from electrical contact with the other edge of the shielding layer.

Jacket 10 is held snugly in place against the wire harness, as by multiple servings of cording 20. As is there shown, a single length of the cord encircles the cable at least once followed by a half-hitch loop 21. Servings 20 may be spaced apart greater distances along straight sections of the harness than along bends or curves in the harness. It will also be understood that knots may be made at intervals to lock the cording against loosening and to prevent objectionable slack occurring in the cording should any portion of it be broken accidentally or otherwise. Some users prefer to store the cording on a shuttle for convenience in providing a captive supply of the cording while releasing small lengths as necessary and expedient in applying successive servings of the cording.

Figure 1:
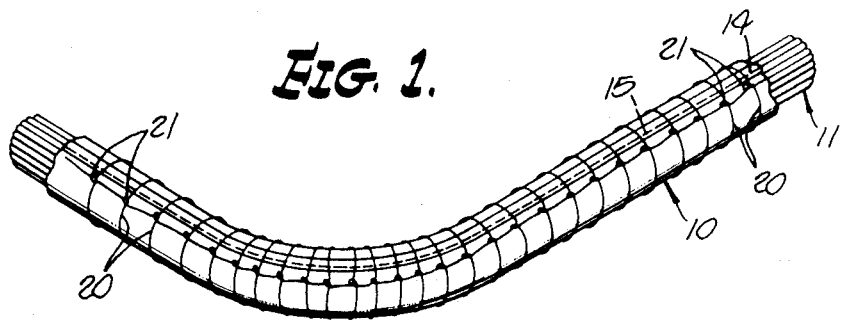
FIG. 1 is a perspective view showing one illustrative mode of assembling the invention jacketing about a length of wire harness.

Only a short length of harness 11 has been shown but it will be understood that typical harnesses are often quite complex in configuration and located in highly congested areas along with other equipment thereby making it extremely difficult to enshroud the harness with shielding jackets of the type heretofore available and typically utilizing interlocking seams to hold them in assembled position. It is evident from FIG. 1 that the invention jacketing is not subject to these handicaps and can be used about harness exposed to very high velocity air currents and turbulent conditions such as in areas adjacent open aircraft bomb hatches and wheel well covers.

Figure 5:
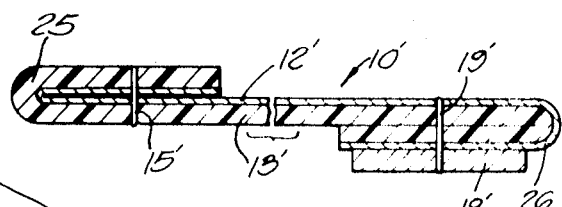
FIG. 5 is a cross-sectional view of the jacket illustrating a second preferred embodiment.

FIG. 5 illustrates a second preferred embodiment 10' the corresponding parts of which are designated by the same reference characters as in FIGS. 1–4 but distinguished by the application of a prime. It will be understood that it differs from the first described embodiment in the omission of both of the binder strips 14,17 made possible without sacrifice of any benefit by overturning, in opposite directions, a narrow portion of each lateral edge. Thus as is clearly shown in FIG. 5, both the left- and right-hand edges are overturned clockwise to provide a fully insulated left edge 25 and a fully conductive right edge 26. In this manner, a high-efficiency low-cost shielded jacket is provided from a single strip of laminated material and a grounding conductor 18'.

While the particular wraparound electrical shielding jacket and method for wire harness herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. That method of enshrouding a wire harness with a barrier jacket against the passage of electrical flux fields which comprises: wrapping the wire harness to be protected with a wide strip of flexible laminated material having an inner conductive layer secured to a supple outer nonconductive layer and embraced along one lateral edge by conductive material and its other lateral edge protected with nonconductive material and including conductive braid, employing a strip of said laminated material having a width sufficiently greater than the girth of the harness being enshrouded for said lateral edges to overlap with said conductive binder strip innermost and in conductive relation to the juxtaposed areas of the conductive laminate extending along the other lateral edge of said barrier jacket, and lacing said jacketed harness with closely spaced taut servings of cording effective to hold said barrier jacket snugly wrapped about said harness.

2. That method defined in claim 1 characterized in the step of locating said conductive braid along the side of said laminate remote from said conductive layer and in position for metal-to-metal contact with said foil layer when said lateral edges are overlapped as defined in claim 1.

3. That method defined in claim 2 characterized in the step of enshrouding the wire harness with said barrier jacket progressively from one end thereof and applying said lacing progressively from said one end of the jacket toward the other end thereof.

4. A wraparound tubular shielding jacket for use to enshroud wire harness with a barrier against electrical flux fields, said jacket comprising: continuous coextensive strips of conductive foil and supple nonconductive sheet material laminated together, nonconductive material embracing one lateral edge of said laminated strip, conductive material embracing the other lateral edge of said laminated strip and including flexible conductive braid secured to and in intimate contact with said conductive strip, and said laminated strip being sufficiently wide for its lateral edges to overlap one another widely when wrapped about a wire harness to be shielded as respects electrical flux fields.

5. A wraparound tubular shielding jacket as defined in claim 4 characterized in the provision of cording wrapable under tension at closely spaced intervals about said jacket when the latter is applied about wire harness to hold the same snugly in place with the opposite lateral edge portions of said conductive strip in substantially continuous contact.

6. A wraparound tubular shielding jacket as defined in claim 5 wrapped snugly about a length of wire harness, and said cording being continuous and arranged in ringlet servings at closely spaced intervals along the length of said wire harness and with adjacent ringlet servings interconnected one with another through a short length of said cording.

7. A wraparound tubular shielding jacket as defined in claim 4 characterized in that the opposite lateral edges thereof are overturned in the same direction and secured together so overturned to provide a jacket fully insulated along one edge and having a conductive layer embracing the other edge thereof, and flexible conductive conductor means secured to one of said overturned edges and in continuous electrical contact with said conductive layer adjacent said edge.

8. A wraparound shielding jacket adapted to be wrapped about a wire harness or the like electrical members to protect the same against the passage of flux fields, said jacket comprising a continuous and elongated flexible strip of laminated material including an exposed layer of conductive material and an exposed layer of supple nonconductive, the opposite lateral edges of said laminated strip being overturned in the same direction and secured together thereby to provide a fully insulated edge along one edge thereof and a noninsulated conductive edge along the other edge thereof, and a flexible conductor secured to said conductive material along one of said overturned edges.

9. A wraparound jacket as defined in claim 8 characterized in that said flexible conductor is exposed and in continuous contact with said conductive material.

* * * * *